United States Patent Office 3,144,433
Patented Aug. 11, 1964

3,144,433
PROCESS FOR THE PRODUCTION OF EUPOLYOXYMETHYLENES
Heinrich Hopff and Hermann Metzler, Zurich, Switzerland, assignors to Deutsche Gold- und Silber-Scheideanstalt vormals Roessler, Frankfurt, Germany
No Drawing. Filed June 13, 1960, Ser. No. 35,412
Claims priority, application Germany June 12, 1959
6 Claims. (Cl. 260—67)

The present invention relates to a novel process for the production of eupolyoxymethylenes.

The object of the present invention is to provide novel polymerization catalysts for the polymerization of eupolyoxymethylenes. The utilization of these catalysts, furthermore, results in the production of polyoxymethylenes which have high molecular weights and which exhibit good thermoplastic characteristics.

Eupolyoxymethylenes can be produced by several different processes. Among these processes, for example, there is the technique of polymerizing monomeric formaldehyde in an inert liquid medium in the absence of water and in the presence of dispersing agents and polymerization catalysts, such as, aliphatic or aromatic amines. Such processes are disclosed in U.S. 2,768,994 and "High Molecular Organic Compounds" (Die hochmolecularen organischen Verbindungen), H. Staudinger and W. Kern, 1932, pages 280–287. Trialkylarsines, trialkylstibines and trialkylphosphines have also been used as catalysts in these polymerization techniques. Furthermore it is also known to the art that formaldehydes can be polymerized at lower temperatures in solvents in the presence of sulfuric acid or boron trichloride. The polymerization can also be conducted so that a small portion of the total quantity of formaldehyde to be polymerized is first polymerized before the remaining major portion is polymerized and this smaller quantity of polymer is then separated from the as yet unpolymerized major portion of the monomer together with any impurities that may be present.

It has also been proposed, in order to obtain eupolyoxymethylenes with improved resistance to heat, to polymerize the monomeric formaldehyde in the presence of a sulfur compound which contains the structural element

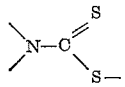

Sulfur compounds of this type include, for example, thiouram disulfide, tetramethyl thiouram disulfide, 2-mercaptobenzothiazole and the like. This disclosure is made in U.S. application S.N. 815,280, filed May 25, 1959.

It is also known that eupolyoxymethylenes can be produced from formaldehyde in the presence of compounds having the general formula $R_nM$, in which M is a metal such as copper or aluminum and R is a thiohydrocarbon radical.

It has also been proposed, as disclosed in U.S. application S.N. 690, filed January 6, 1960, now Patent No. 3,020,264, to produce eupolyoxymethylenes from monomeric formaldehyde by conducting the polymerization in the presence of sulfur suspended or dissolved in dry benzine and/or decalin and by using monomeric formaldehyde that has freed of moisture as much as possible. In this procedure the cross-sectional particle size of the suspended sulfur is preferably smaller than $200\mu$. According to this proposed process the sulfur to be used can be ventilated pure sulfur or fine particled plastic sulfur or a monoclinic or a macromolecular sulfur which is insoluble in rubber.

It has also been disclosed in U.S. application 22,088, now Patent No. 3,110,700, filed March 24, 1960, that eupolyoxymethylenes can also be produced easily and in good yields by the polymerization of water free formaldehyde or lower molecular weight polymers of formaldehyde in the presence of an inert organic diluent such as petroleum ether or a higher boiling hydrocarbon fraction if desired and a catalyst, if at least one halogenated methane is used as the catalyst. Such halogenated methanes, for example, are carbon tetrachloride, chloroform, methylene chloride, bromoform and the like.

It has now been found, according to the present invention, that the yields of eupolyoxymethylenes produced by the process disclosed in S.N. 22,088, now Patent No. 3,110,700 can be increased, if at least one per compound is used as an additional catalyst in combination with the halogenated methane catalyst disclosed in the process of S.N. 22,088, now Patent No. 3,110,700. Inorganic as well as organic compounds can be used within the contemplation of the present invention. For example, potassium persulfate or lauryl peroxide are very effective. However, it is preferable to use such per compounds which contain three substituted radicals on an $\alpha$ carbon atom, such as di-tertiary-butyl peroxide, tertiary butyl perbenzoate and cumene hydrogen peroxide.

These per compounds and halogenated methanes are each prefereably used in amounts of 0.01 to 10% by weight, with respect to the amount of starting formaldehyde compound used.

This present process is advantageously conducted at temperatures of 50 to 90° C. and preferably at 70 to 75° C.

It is also advantageous to use still other catalysts, which are known to be formaldehyde polymerization catalysts, together with the catalyst system disclosed in the present application. Such other formaldehyde polymerization catalysts include, in particular, metal carbonyls, such as iron penta carbonyl, cobalt carbonyl, molybdenum carbonyl and the like.

If the polymerization were to be conducted using one of the above mentioned per compounds as the only catalysts, then the yield of eupolyoxymethylenes would only amount to about 10%. However, when these per compounds are used in combination with the halogenated methanes disclosed in S.N. 22,088 then yields are obtained, which can amount to over 95%.

A lower molecular weight form of formaldehyde, such as trioxane, can be used as the starting material. It is also possible to use with good advantage gaseous or liquid forms of formaldehyde. The gaseous form can be produced, for example, by pyrolysis.

The eupolyoxymethylenes produced according to this invention can be readily worked up into formed bodies in the customary thermoplastic processes, such as, for example, extrusion molding, pressing, and the like, or they can be used to coat objects. When desirable, it is also possible to conduct the process of this invention in the presence of other known materials for improving the workability of the eupolyoxymethylenes and/or their stability and/or mechanical properties of the shaped bodies produced therefrom. Among such materials are plasticizers, such as the glycols, particularly propylene glycol and stabilizers, that is, compounds which react with hydroxyl groups, such as carboxylic acid anhydrides, for example, acetic acid anhydride, propionic acid anhydride and the like, and ketenes. In addition urea, hydrazine and the like can also be used as stabilizers.

It is possible to obtain formed bodies which are ductile and elastic from the novel eupolyoxymethylenes produced by this invention. Furthermore when these formed bodies are heated to 180° C. for an hour only a trivial amount of depolymerization takes place.

Fillers and coloring agents can also be used in admixture with these novel eupolyoxymethylenes. This particularly includes such materials as glass fibers and mineral wool.

It is also advantageous in this regard to use highly dispersed, particularly active filling materials, for example, carbon black and preferably alkaline carbon black or oxides of metals or metalloids such as aluminum oxide, titanium oxide, zirconium oxide or silicon dioxide which were obtained by decomposing volatilized compounds of these materials at high temperature in an oxidizing or hydrolyzing medium.

When used as a plastic material for forming shaped bodies, the eupolyoxymethylenes produced by the process of the present invention were stabilized in a manner known to the art by an after treatment with, for example, acetic acid anhydride.

The molecular weight of the eupolyoxymethylenes produced by the process of this invention varies between 15,000 and 35,000 depending on reaction conditions and catalyst systems. These eupolyoxymethylenes have a softening point of approximately 175° to 185° C.

The following examples are illustrative of the present invention but are not intended as a limitation thereon.

*Example 1*

50 parts of 98% trioxane were heated at 70° C. for a few hours in a metal tube with one part carbon tetrachloride and one part di-tertiary-butyl peroxide. The unreacted monomeric material that was still present was removed by washing with methanol. The yield was 48 parts of eupolyoxymethylene having a melting point of 185° C. and a molecular weight of about 19,500.

*Example 2*

5 parts of 98% trioxane were heated at 70° C. in an ampoule for 20 hours with 0.05 part carbon tetrachloride and 0.05 part cumene hydrogen peroxide. After washing out the unpolymerized monomers with methanol, 4.5 parts of eupolyoxymethylene was recovered which had a melting point of 180° C. and a molecular weight of about 15,000.

*Example 3*

Closed in an ampoule 5 parts of trioxane were heated in an oilbath at 160° C. with 0.05 part carbon tetrachloride and 0.05 part di-tertiary-butyl peroxide. The reaction mixture was cooled and the unreacted material that was still present was removed by washing with methanol. The residue was dried to yield 3.7 parts of polyoxymethylene.

*Example 4*

5 parts of trioxane were heated at 70° C. in an ampoule for 24 hours with 0.05 part carbon tetrachloride and 0.05 part of a peroxide. The experiment was repeated using the peroxide in the same amount but without carbon tetrachloride. The obtained polyoxymethylene was purified as described in Example 2. The yields are shown in the following table.

| Catalyst: | Yield (parts) |
| --- | --- |
| Potassium persulfate | 0.6 |
| Potassium persulfate and CCl$_4$ | 1.8 |
| Benzoyl peroxide | Trace |
| Benzoyl peroxide and CCl$_4$ | 1.3 |
| Tertiary-butyl peroxide | Trace |
| Tertiary-butyl peroxide and CCl$_4$ | 1.4 |
| Tertiary-butyl perbenzoate | Trace |
| Tertiary-butyl perbenzoate and CCl$_4$ | 2.2 |
| Cyclohexanone peroxide | Trace |
| Cyclohexanone peroxide and CCl$_4$ | 1.4 |
| Lauroyl peroxide | Trace |
| Lauroyl peroxide and CCl$_4$ | 2.5 |

We claim:

1. In a process for the production of eupolyoxymethylenes by bulk polymerization, the step which comprises bulk polymerizing trioxane in the absence of water in the presence of 0.01–10% by weight of at least one halogenated methane selected from the group consisting of carbon tetrachloride, chloroform, methylene chloride and bromoform and 0.01 to 10% by weight of at least one peroxy compound selected from the group consisting of persulfates and organic peroxides relative to the amount of trioxane at a temperature between about 50 and 90° C.

2. A process as in claim 1 in which said halogenated methane is carbon tetrachloride.

3. A process as in claim 1 in which said peroxy compound contains three substituted radicals on an α carbon atom.

4. A process as in claim 3 in which said peroxy compound is ditertiary butyl peroxide.

5. A process as in claim 3 in which said peroxy compound is cumene hydrogen peroxide.

6. A process as in claim 1 in which said polymerization is conducted at a temperature of 70–75° C.

References Cited in the file of this patent
UNITED STATES PATENTS

| 2,734,889 | Starr | Feb. 14, 1956 |
| 2,828,286 | MacDonald | Mar. 25, 1958 |
| 2,985,623 | Schweitzer et al. | May 23, 1961 |

OTHER REFERENCES

Walker, J. F.: Formaldehyde, 2nd edition, chapter 7 (1953).